(12) United States Patent
Saberian et al.

(10) Patent No.: US 11,924,380 B2
(45) Date of Patent: *Mar. 5, 2024

(54) MACHINE-LEARNING SYSTEM FOR INCOMING CALL DRIVER PREDICTION

(71) Applicant: TD Ameritrade IP Company, Inc., Omaha, NE (US)

(72) Inventors: Nafiseh Saberian, Ann Arbor, MI (US); Ravindra Reddy Tappeta Venkata, Novi, MI (US); Stephen Filios, Canton, MI (US); Logan Sommers Ahlstrom, Ann Arbor, MI (US); Abhilash Krishnankutty Nair, Ann Arbor, MI (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/888,847

(22) Filed: Aug. 16, 2022

(65) Prior Publication Data

US 2022/0394131 A1 Dec. 8, 2022

Related U.S. Application Data

(63) Continuation of application No. 16/917,752, filed on Jun. 30, 2020, now Pat. No. 11,431,848.

(51) Int. Cl.
*H04M 3/00* (2006.01)
*G06N 5/04* (2023.01)
*G06N 20/00* (2019.01)
*G06Q 30/016* (2023.01)
*H04M 3/51* (2006.01)

(52) U.S. Cl.
CPC ............ *H04M 3/5183* (2013.01); *G06N 5/04* (2013.01); *G06N 20/00* (2019.01); *G06Q 30/016* (2013.01); *H04M 2203/558* (2013.01)

(58) Field of Classification Search
CPC ........ G06N 20/00; G06N 5/04; G06Q 30/016; H04M 2203/558; H04M 3/5183
See application file for complete search history.

(56) References Cited

U.S. PATENT DOCUMENTS

| 7,873,157 | B1 | 1/2011 | Sim |
| 9,118,763 | B1 | 8/2015 | Margulies et al. |
| 10,356,244 | B1 | 7/2019 | Sengupta et al. |
| 10,637,991 | B1 | 4/2020 | Chan et al. |
| 10,714,084 | B2 | 7/2020 | Engles et al. |
| 10,805,469 | B1 | 10/2020 | Chan et al. |
| 2019/0251959 | A1 | 8/2019 | Engles et al. |

*Primary Examiner* — Rasha S Al Aubaidi
(74) *Attorney, Agent, or Firm* — Harness, Dickey & Pierce, P.L.C.

(57) ABSTRACT

A method includes selecting a customer of a company; constructing a digital footprint of the selected customer. The method includes inputting the digital footprint to an artificial intelligence (AI) engine. The method includes obtaining one or more probability values from the AI engine based on the input digital footprint. The method includes selecting a call driver, from among a plurality of call drivers, as a predicted call driver. The method includes providing the predicted call driver to a call center associated with the company.

14 Claims, 11 Drawing Sheets

| client_id | aboutmargin+/ p/site#=aboutmargin | aboutmargin+ digitized forms] - [margin] - [edit] - [investment objectives] - [save | aboutmargin +download] - [digitized forms] - [margin apply] - [opened | aboutmargin +menu] - [header] - [profile menu] - [open |
|---|---|---|---|---|
| XXXXXXX | 2 | 1 | 1 | 0 |
| XXXXXXX | 1 | 1 | 1 | 0 |
| XXXXXXX | 9 | 1 | 2 | 0 |
| XXXXXXX | 1 | 1 | 1 | 0 |
| XXXXXXX | 1 | 1 | 1 | 0 |
| XXXXXXX | 1 | 1 | 1 | 1 |
| XXXXXXX | 1 | 1 | 1 | 0 |

*FIG. 5A*

| client_id | count_rejected_orders | count_successful_orders | last_rejected_order_passed_seconds |
|---|---|---|---|
| XXXXXXXX | 7 | 21 | 27010 |
| XXXXXXXX | 25 | 44 | 21970 |
| XXXXXXXX | 20 | 3 | 2989 |
| XXXXXXXX | 15 | 13 | 20147 |
| XXXXXXXX | 14 | 3 | 4754 |
| XXXXXXXX | 1 | 2 | 12537 |

FIG. 5B

| client_id | count_chats | count_emails |
|---|---|---|
| XXXXXXX | 0 | 1 |
| XXXXXXX | 1 | 0 |
| XXXXXXX | 0 | 0 |
| XXXXXXX | 0 | 2 |
| XXXXXXX | 1 | 0 |
| XXXXXXX | 0 | 0 |
| XXXXXXX | 0 | 1 |

*FIG. 6A*

| client_id | forex_approval (binary) | forex_approval_day_passed | forex_application_applied_recently (binary) | forex_application_rejected_recently (binary) |
|---|---|---|---|---|
| XXXXXXX | 1 | 12 | 0 | 0 |
| XXXXXXX | 1 | 3 | 1 | 0 |
| XXXXXXX | 1 | 100 | 0 | 0 |
| XXXXXXX | 0 | 0 | 1 | 1 |
| XXXXXXX | 1 | 24 | 0 | 0 |
| XXXXXXX | 0 | 0 | 1 | 1 |

| Client_id | Balance_delta | Cash_delta |
|---|---|---|
| XXXXXXX | 0.029178098 | 2.91995964 |
| XXXXXXX | 0.411450356 | 7.217614733 |
| XXXXXXX | 3207.896552 | 1.0275089981 |
| XXXXXXX | 32.28283827 | 82.98353744 |
| XXXXXXX | 1.098864178 | 0.469037788 |
| XXXXXXX | 1.135134529 | 6.482727298 |

*FIG. 7*

| Client_id | Aboutmargin+/ p/site#r= aboutmargin | Aboutmargin+digitized forms \|-\| margin \|-\| edit \|-\| investment objectives \|-\| save | ... | Count_ rejected_ orders | Count_ successful_ orders | Count_ chats | ... | Balance_ delta | Cash_delta |
|---|---|---|---|---|---|---|---|---|---|
| XXXXXXX | 2 | 1 | ... | 7 | 21 | 0 | ... | 0.029178098 | 2.91995964 |
| XXXXXXX | 1 | 1 | ... | 25 | 44 | 1 | ... | 0.411450356 | 7.21761473 |
| XXXXXXX | 9 | 1 | ... | 20 | 3 | 0 | ... | 3207.896552 | 1.02750898 |
| XXXXXXX | 1 | 1 | ... | 15 | 13 | 0 | ... | 32.28283827 | 82.98335374 |
| XXXXXXX | 1 | 1 | ... | 14 | 3 | 0 | ... | 1.098864178 | 0.46903779 |
| XXXXXXX | 1 | 1 | ... | 1 | 2 | 1 | ... | 1.135134529 | 6.4827273 |

FIG. 8

MACHINE-LEARNING SYSTEM FOR INCOMING CALL DRIVER PREDICTION

CROSS-REFERENCE TO RELATED APPLICATIONS

This is a continuation of U.S. application Ser. No. 16/917,752, filed on Jun. 30, 2020, the entire contents of which are incorporated, herein, by reference.

FIELD

The present disclosure relates to large-scale data processing and more particularly to predicting call intent from user data.

BACKGROUND

A call center for a company may receive as many as 10s of thousands of calls daily from customers depending the size of the company and the amount of business the company does. For each call, the calling customer may be calling for one or more of a number of different reasons. By improving the call center's response to a customer's call, the quality of service experienced by the customer is also improved. When the aggregate quality of service experienced by the customers is improved, the company may retain more existing customers and attract more new customers thus resulting in an overall benefit to the performance of the company.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least some example embodiments, a method includes selecting a customer of a company; constructing a digital footprint of the selected customer; inputting the digital footprint to an artificial intelligence (AI) engine; obtaining one or more probability values from the AI engine based on the input digital footprint; selecting a call driver, from among a plurality of call drivers, as a predicted call driver; and providing the predicted call driver to a call center associated with the company.

The method may further include detecting a call received at the call center from a customer, wherein the selected customer is the customer from whom the call was received.

Constructing the digital footprint may include retrieving a plurality of digital breadcrumbs from user data of the customer stored in an enterprise data warehouse (EDW) database (DB); and storing the retrieved digital breadcrumbs in a digital footprint DB in such a manner that the digital breadcrumbs are all mapped to the customer.

The AI engine may include at least one of a decision tree, a linear classifier, a neural network, and a time series classifier.

The one or more probability values may correspond, respectively, to one or more call drivers from among the plurality of call drivers.

Selecting a call driver as the predicted call driver may include selecting, as the predicted call driver, the call driver from among the one or more call drivers, that corresponds to the highest probability value from among the one or more probability values.

The method may further include receiving an indication of a customer, wherein the selected customer is the customer for whom the indication was received.

Constructing the digital footprint may include retrieving a plurality of digital breadcrumbs from user data of the customer stored in an enterprise data warehouse (EDW) database (DB); and storing the retrieved digital breadcrumbs in a digital footprint DB in such a manner that the digital breadcrumbs are all mapped to the customer.

The AI engine may include at least one of a decision tree, a linear classifier, a neural network, and a time series classifier.

The one or more probability values may correspond, respectively, to one or more call drivers from among the plurality of call drivers.

Selecting a call driver as the predicted call driver may include selecting, as the predicted call driver, the call driver from among the one or more call drivers, that corresponds to the highest probability value from among the one or more probability values.

According to at least some example embodiments, a computer system includes memory storing computer-executable instructions and a processor configured to execute the computer-executable instructions. The computer-executable instructions include selecting a customer of a company; constructing a digital footprint of the selected customer; inputting the digital footprint to an artificial intelligence (AI) engine; obtaining one or more probability values from the AI engine based on the input digital footprint; selecting a call driver, from among a plurality of call drivers, as a predicted call driver; and providing the predicted call driver to a call center associated with the company.

The computer-executable instructions may include detecting a call received at the call center from a customer, and the selected customer may be the customer from whom the call was received.

Constructing the digital footprint may include retrieving a plurality of digital breadcrumbs from user data of the customer stored in an enterprise data warehouse (EDW) database (DB); and storing the retrieved digital breadcrumbs in a digital footprint DB in such a manner that the digital breadcrumbs are all mapped to the customer.

The AI engine may include at least one of a decision tree, a linear classifier, a neural network, and a time series classifier.

The one or more probability values may correspond, respectively, to one or more call drivers from among the plurality of call drivers.

Selecting a call driver as the predicted call driver may include selecting, as the predicted call driver, the call driver from among the one or more call drivers, that corresponds to the highest probability value from among the one or more probability values.

The computer-executable instructions may include receiving an indication of a customer, and the selected customer may be the customer from whom the indication was received.

Constructing the digital footprint may include retrieving a plurality of digital breadcrumbs from user data of the customer stored in an enterprise data warehouse (EDW) database (DB); and storing the retrieved digital breadcrumbs in a digital footprint DB in such a manner that the digital breadcrumbs are all mapped to the customer.

The AI engine may include at least one of a decision tree, a linear classifier, a neural network, and a time series classifier.

The one or more probability values may correspond, respectively, to one or more call drivers from among the plurality of call drivers.

Selecting a call driver as the predicted call driver may include selecting, as the predicted call driver, the call driver from among the one or more call drivers, that corresponds to the highest probability value from among the one or more probability values.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5A illustrates examples of clickstream breadcrumbs according to principles of the present disclosure.

FIG. 5B illustrates examples of trading breadcrumbs according to principles of the present disclosure.

FIG. 6A illustrates examples of email/chat breadcrumbs according to principles of the present disclosure.

FIG. 6B illustrates examples of account approval breadcrumbs according to principles of the present disclosure.

FIG. 7 illustrates examples of balance breadcrumbs according to principles of the present disclosure.

FIG. 8 illustrates an example of a digital footprints according to principles of the present disclosure.

In the drawings, reference numbers may be reused to identify similar and/or identical elements.

DETAILED DESCRIPTION

When a company's call center receives a call from a customer, that company may have access to large amounts of user data corresponding to the customer. The user data for a customer is, for example, data regarding the customer's dealings with the company. If the customer data is used by the company to predict why the customer might be calling, the company may be able to anticipate the desires of the customer thus increasing the overall quality of the customer's experience with the company.

According to principles of the present disclosure, user data for several customers is used to train an artificial intelligence (AI) engine of a call driver prediction architecture to predict a call driver of a customer's call based on that customer's user data. The term call driver refers to the intent behind the customer's call which may include, for example, a topic that the customer wishes to discuss during the call. Once trained, the AI engine of the call driver prediction architecture can take the user data of a customer that is currently calling into the call center as input and output probabilities corresponding to various call drivers. These probabilities may be used to inform a service agent or an interactive voice response (IVR) system of the call center of one or more probable call drivers associated with the call. Further, the service agent or IVR system may utilize the one or more probable call drivers to provide enhanced service to the calling customer, thereby improving the quality of the customer's experience with the call center. FIGS. 1-9 below are explained with reference to an example in which a company associated with call driver prediction architecture according to principles of the present disclosure is a financial services company. However, the call driver prediction architecture according to principles of the present disclosure is not limited to financial services companies and can be used with any type of company that deals with calls from customers.

Figure 1:
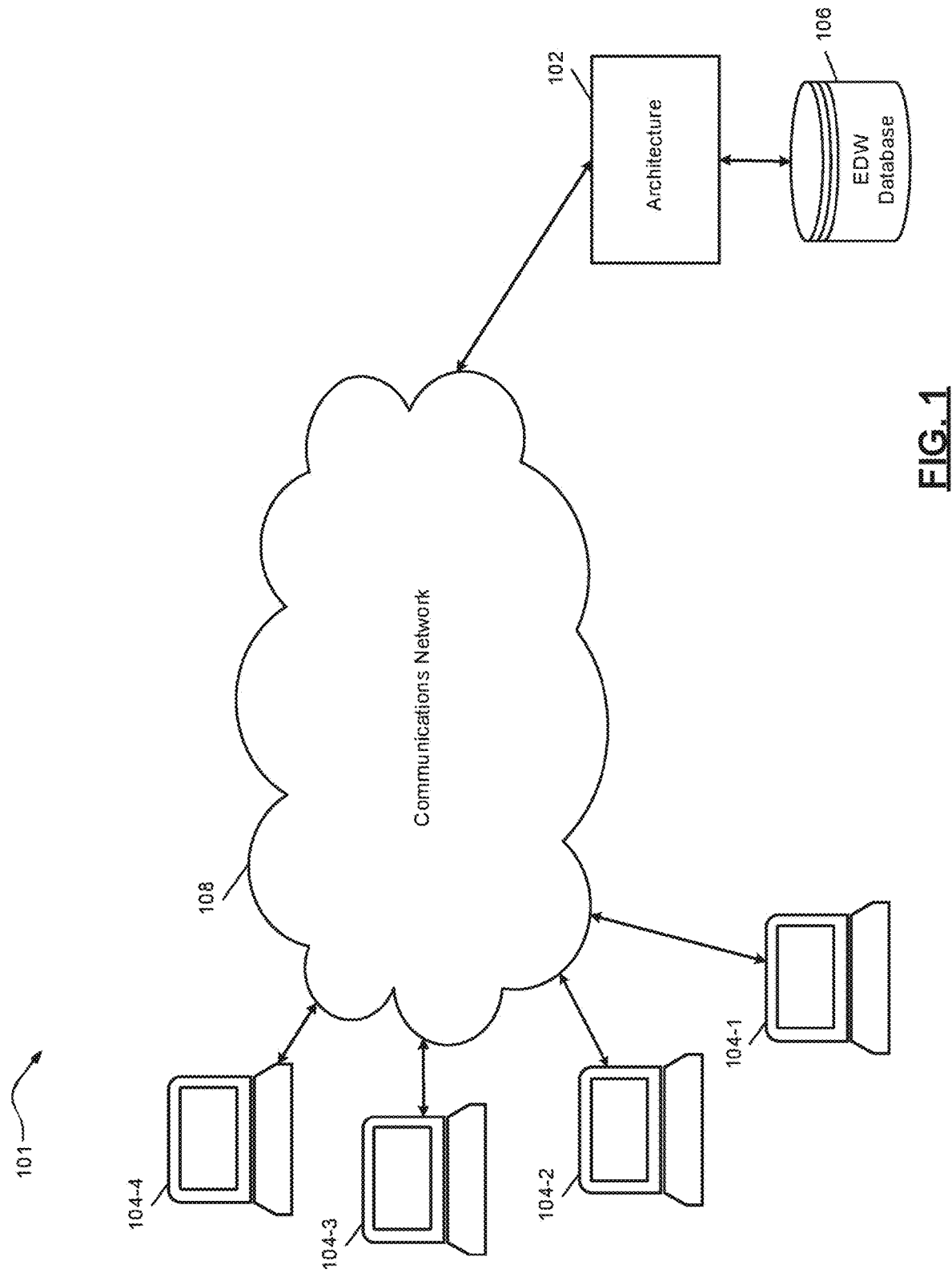
FIG. 1 is a diagram illustrating a portion of a communications system according to principles of the present disclosure.

FIG. 1 illustrates a portion of a communications system 101 according to principles of the present disclosure. The communications system 101 may include a call driver prediction architecture 102, user devices 104 including first through fourth user devices 104-1-104-4, and an enterprise data warehouse (EDW) database (DB). The call driver prediction architecture 102 and the user devices 104 are capable of performing wired and/or wireless communications with each other via communications network 108. The communications network 108 may be any network capable of transmitting electronic data. Examples of the communications network 108 include, but are not limited to, a wireless communications network such as a cellular network or a WiFi network, a local area network (LAN), and the Internet. The call driver prediction architecture 102 may be, for example a desktop computer or a server. Each of the user devices 104 may be any one of, for example, a laptop, a desktop computer, a smart phone, a tablet, a personal digital assistant, and a wearable device.

Figure 2:
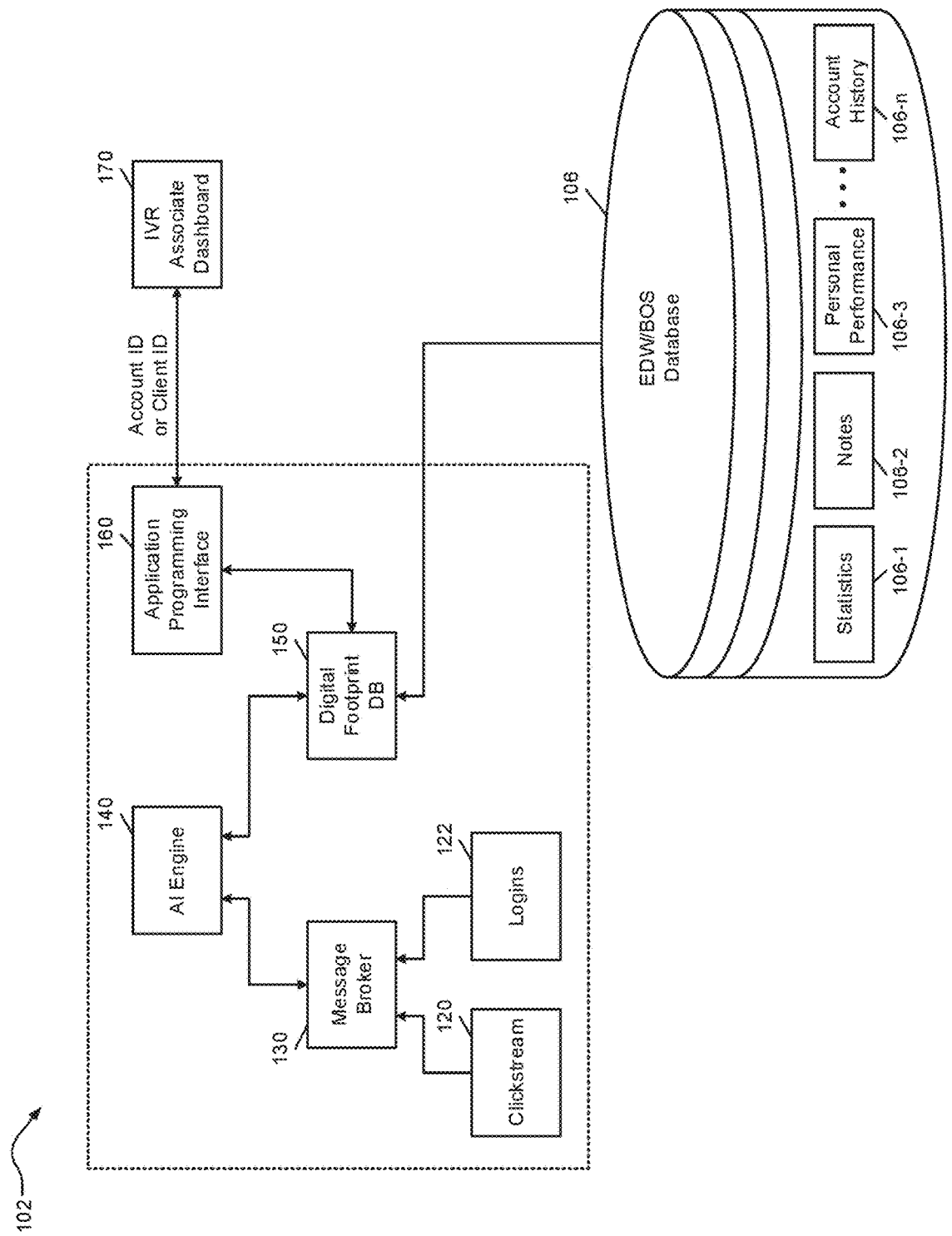
FIG. 2 is a diagram illustrating a call driver prediction architecture according to principles of the present disclosure.

FIG. 2 is a diagram illustrating the call driver prediction architecture 102 according to principles of the present disclosure. Referring to FIG. 2, the call driver prediction architecture 102 may include a message broker 130, an AI engine 140, a digital footprint DB 150 and an application programming interface (API) 160. In various implementations, the AI engine 140 may include a machine-learning model implemented in the Python programming language from the Python Software Foundation. In various implementations, the DB 150 may be a NoSQL database, such as the MongoDB database from MongoDB Inc.

According to at least one example embodiment, the call driver prediction architecture 102 may include or be implemented by one or more circuits or circuitry (e.g., hardware) specifically structured to carry out and/or control some or all of the operations described in the present disclosure as being performed by the call driver prediction architecture 102 (or an element thereof). According to at least one example embodiment, the call driver prediction architecture 102 may include or be implemented by a memory and one or more processors executing computer-readable code (e.g., software and/or firmware) that is stored in the memory and includes instructions for causing the one or more processors to carry out and/or control some or all of the operations described in the present disclosure as being performed by the call driver prediction architecture 102 (or an element thereof).

In the example illustrated in FIG. 2, the message broker 130 is a RabbitMQ™ message broker. The message broker 130 is capable of receiving information in a first messaging protocol and translating the information to at least one second messaging protocol. According to at least some example embodiments, the message broker 130 may receive login info 122 of customers logging-in to a company website of a company associated with the call driver prediction architecture 102. If a customer provides accurate login information, the customer is granted access to the company website and may visit and interact with various pages of the company website. The pages visited and actions performed on the company website by the logged-in customer may be received at the call driver prediction architecture 102 as input clickstream data 120.

As is also illustrated in FIG. 2, the call driver prediction architecture 102 may be connected to the EDW DB 106, which may store multiple types of user data 106-1 through 106-n corresponding to some or all customers of the company associated with the call driver prediction architecture 102. Examples of the types of data that may be stored in the EDW DB 106 for each customer include, but are not limited to, previously stored clickstream data of the customer, demographic information of the customer, a trading history of the customer, an account approval history of the customer, an email/chat history of the customer, an account balance history of the customer, and a call history of the customer.

The previously stored clickstream data stored in the EDW DB 106 may be, for example, clickstream data that was initially acquired as input clickstream data 120 before being stored in the EDW DB 106. For example, according to at least one example embodiment, the user devices 104 illustrated in FIG. 1 may each be devices that are used by customers of the company associated with the call driver prediction architecture 102 in order to visit a company web associated with the company. Further, the call driver prediction architecture 102 is capable of determining, as part of the input clickstream data 120, which pages of the website each visitor visits, an order in which each visitor visits pages of the website, and/or a frequency with which each visitor visits each visited page of the website. Further, the call driver prediction architecture 102 is capable of determining, as part of the input clickstream data, clicks made by a visitor or items selected by the visitor with respect to the pages visited by the visitor. The term visitor may refer to a user device that accesses at least one page of the company website or a customer of the company who is using such a user device. As an example, if the first user device 104-1 visits multiple pages of the company website in a certain sequence, during a browsing session, the call driver prediction architecture 102 may obtain the sequence of pages visited by the user device and clicks or other actions performed by the user device 104-1 with respect to the visited pages during the browsing session as input clickstream data 120 and store the input clickstream data 120 in the EDW DB 106. In various implementations, a browsing session is a period during which a visitor is continuously accessing pages of the company website. For example, a browsing session may be a period during which a user is continuously clicking, via a user device of the user, on links of pages of the company website and does not cease the continuous clicking for more than a threshold amount of time (e.g., 30 minutes).

Examples of demographic information of customers that may be stored in the EDW DB 106 include, but are not limited to, an age of the customer; a marital status of the customer; an indication of how many kids the customer has, if any; the length of time the customer has been a customer of the company associated with the call driver prediction architecture 102; a home address of the customer; a work address and employer of the customer, etc.

One examples of trading history information of each customer that may be stored in the EDW DB 106 is a list of trades made by the customer including, for each listed trade, the type of trade made (e.g., futures, foreign exchange or forex, etc.), the date and time of the trade, and the amount of the trade (e.g., an amount of money and/or number of traded units associated with the trade).

One example of account approval history information of each customer that may be stored in the EDW DB 106 is a list of each instance where the customer requested approval to perform a particular type of action on the customer's account. Examples of such approvals include, but are not limited to, approval for margins trading, approval for options trading and approval for foreign exchange (forex) trading. The account approval history may include dates and times when the various approvals were requested by the customer, dates and times when a response to each request was provided, and the result of the response (e.g., approved or denied).

One example of email/chat history information of each customer that may be stored in the EDW DB 106 includes a collection of each email sent by the customer to service personnel of the company and each chat conversation between the customer and a service representative of the company.

One example of an account balance history of each customer that may be stored in the EDW DB 106 includes a list of balances of the customer's account at each of various dates and/or times (e.g., monthly, weekly, daily, hourly, etc).

One example of call history information of the customer that may be stored in the EDW DB 106 includes a list of each time the customer called a service representative of the company, a date and time of the call, and a call driver of the call.

Figure 3:
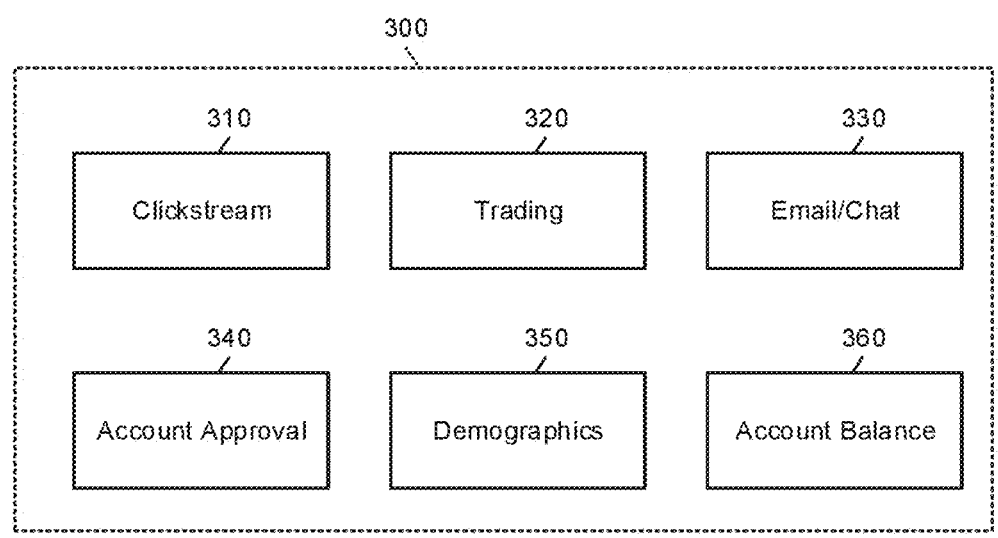
FIG. 3 illustrates an example of a digital footprint according to principles of the present disclosure.

Returning to FIG. 2, the call driver prediction architecture 102 is capable of using the multiple types of user data stored in the EDW DB 106 to construct, for each of one or more customers, a digital footprint. A customer's digital footprint may include a group of digital breadcrumbs that indicate the customers activities with respect to the company associated with the call driver prediction architecture 102 over a particular period of time. FIG. 3 illustrates an example of a digital footprint according to principles of the present disclosure. FIG. 3 illustrates a digital footprint 300. As is illustrated in FIG. 3, the digital footprint may include digital breadcrumbs 310~360. In various implementations, digital breadcrumbs 310~360 of the digital footprint 300 include a clickstream breadcrumb 310, a trading history breadcrumb 320, an email/chat breadcrumb 330, an account approval breadcrumb 340, a demographics breadcrumb 350, and an account balance breadcrumb. According to at least some example embodiments, each breadcrumb in a customer's digital footprint includes a portion of a particular type of data stored for the customer in the EDW DB 106.

For example, for a particular customer, the EDW DB 106 may include user data (e.g., previously stored clickstream data of the customer, demographic information of the customer, a trading history of the customer, an account approval history of the customer, an email/chat history of the customer, an account balance history of the customer, and/or a call history of the customer) corresponding to one or more years or, alternatively, an entire period of time during which the customer has had a business relationship with the company associated with the call driver prediction architecture 102.

In contrast, each breadcrumb 310~360 included in a digital footprint 300 may include user data corresponding to a limited period of time (e.g., one week two weeks or a month). As example, the clickstream breadcrumb 310 of the digital footprint 300 may include previously stored clickstream data corresponding only to the past 7 days from among the entirety of the previously stored clickstream data stored in the EDW DB 106 for the customer for whom the digital footprint 300 was constructed. According to at least some example embodiments, the call driver prediction architecture 102 may construct the digital footprint 300 by looking-up, from the EDW DB 106, different types of user data of the customer for whom the digital footprint 300 is being constructed corresponding to the aforementioned limited period of time, and storing the looked-up different types user data in the digital footprint DB 150 as the digital breadcrumbs 310~360. In various implementations, the call driver prediction architecture 102 generates the digital footprint 300 by storing the digital breadcrumbs 310~360 in the digital footprint DB 150 in such a manner that the digital breadcrumbs 310~360 are all mapped to the customer for whom the digital footprint 300 is being constructed. Once a customer's digital footprint 300 is constructed, the call driver prediction architecture 102 may use the digital footprint as input for the AI engine 140.

In the example illustrated in FIG. 2, the AI engine 140 is implemented as a decision tree constructed using the programming language Python™. For example, the AI engine 140 may be implemented as an XGBoost or random forest decision tree. As another example, the AI engine 140 may be implemented as one or more linear classifiers (e.g., logistic regression or naive Bayes classifier). As another example, the AI engine 140 may be implemented a neural network or a deep leaning model. As yet another example, the AI engine 140 may be implemented as a time series classifier that performs time series classification.

In various implementations, the AI engine 140 has already been trained with training data at the time that the digital footprint 300 is provided to the AI engine 140. Accordingly, in response to receiving the digital footprint 300, the trained AI engine 140 outputs one or more probability values corresponding, respectively, to one or more call drivers. In various implementations, the call driver prediction architecture 102 may select a predicted call driver based on the one or more probability values output by the AI engine 140. For example, the selected predicted call driver may be the call driver, from among a plurality of potential call drivers, that is associated with the highest probability value output by the AI engine 140.

Figure 4:
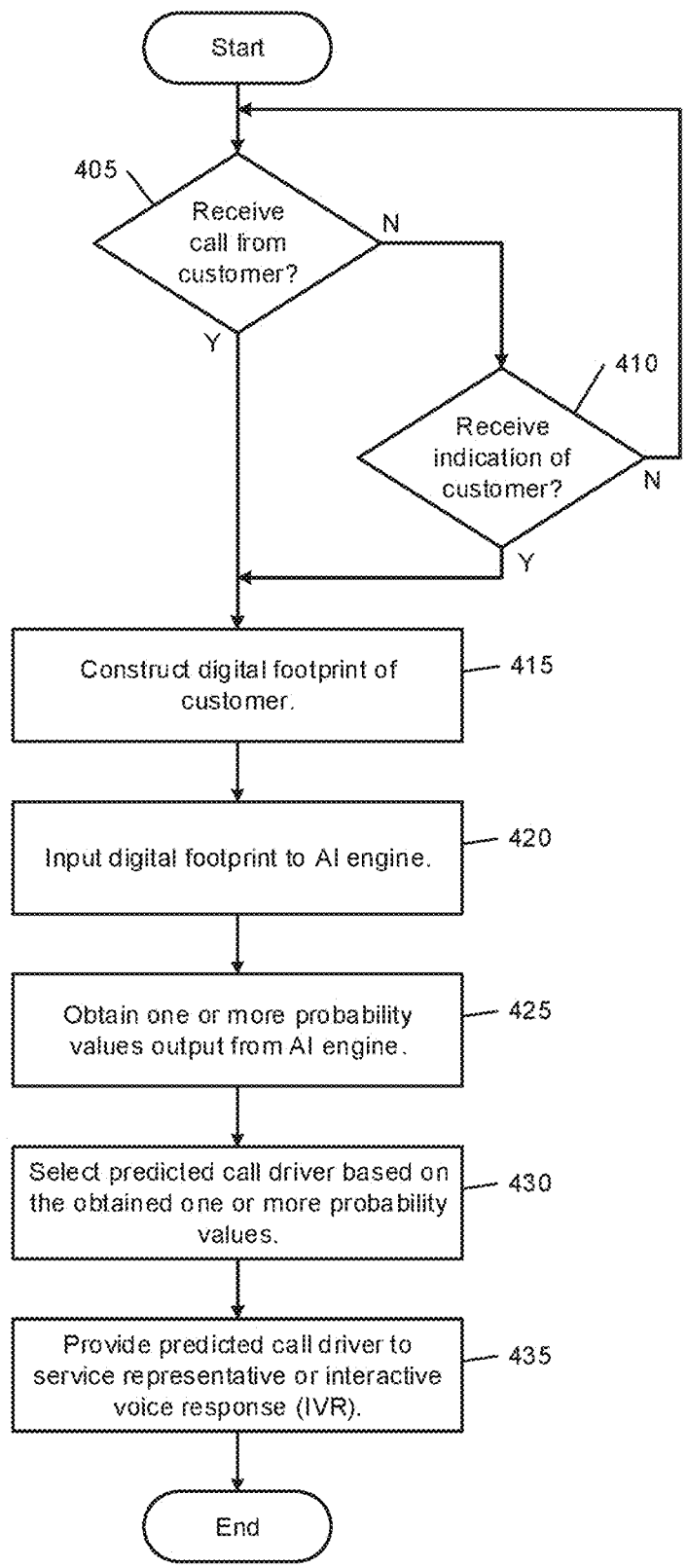
FIG. 4 is a flowchart illustrating a method of predicting a call driver based on a digital footprint according to principles of the present disclosure.

FIG. 4 is a flowchart illustrating a method of predicting a call driver based on a digital footprint according to principles of the present disclosure.

Referring to FIG. 4, in step 405 the call driver prediction architecture 102 determines whether a call has been received from a customer. If, in step 405, the call driver prediction architecture 102 determines that a call has been received from a customer (e.g., at a call center of the company associated with the call driver prediction architecture 102), the call driver prediction architecture 102 proceeds to step 415. If, in step 405, the call driver prediction architecture 102 determines that a call has not been received, the call driver prediction architecture proceeds to step 410.

In step 410, the call driver prediction architecture 102 determines whether a selection of a customer is received. For example, an operator of the call driver prediction architecture 102 or on operator of a company website of the company associated with the call driver prediction architecture 102 may indicate a customer. According to at least some example embodiments, the indicated customer may be a customer for whom an operator of the call driver prediction architecture 102 or a company website of the company associated with the call driver prediction architecture 102 wishes to predict a most likely call driver of a future call. If, in step 410, the call driver prediction architecture 102 determines that an indication of a customer has not been received, the call driver prediction architecture 102 returns to step 405. If, in step 410, the call driver prediction architecture 102 determines that an indication of a customer has been received, the call driver prediction architecture 102 proceeds to step 415.

In step 415, the call driver prediction architecture 102 constructs a digital footprint of the customer from whom a call was received in step 405 or for whom an indication was received in step 410. For example, the call driver prediction architecture 102 may construct a digital footprint by retrieving digital breadcrumbs from user data of the customer stored in the stored in the EDW DB 106, as is discussed above with reference to digital breadcrumbs 310~360 of the digital footprint 300 in FIG. 3.

FIGS. 5A-8 illustrate examples of digital breadcrumbs that may be collected in step 415. FIG. 5A illustrates examples of clickstream breadcrumbs 501. As is illustrated in FIG. 5A, the clickstream breadcrumbs 501 include a client_id column 510. Further, for each client identifier (ID) in the client_id column, the clickstream breadcrumbs 501 include frequency data. The frequency data indicates a number of times a customer having the corresponding ID visited a particular page of the company website or performed a particular action or click with respect to a page of the company website within a particular time period (e.g., one day, 7 days, etc.). In the example illustrated in FIG. 5A, column 512 may correspond to the act of a customer visiting a margins page, column 514 may correspond to the act of a customer editing and saving investment objectives on the margins page, column 516 may correspond to the act of a customer opening an interface on the margin page for applying for authorization to perform margin-related trades, and column 518 may correspond to the act of a customer opening a profile menu on the margins page. For the purpose of simplicity, only a few examples of different instances of clickstream data are shown in clickstream breadcrumbs 501. According to at least some example embodiments, the company website can include any number of pages and any number of actions or clicks that a customer could perform on one or more of the pages, and the clickstream breadcrumbs 501 can include frequency data for any or all of pages and potential acts or clicks.

FIG. 5B illustrates examples of trading breadcrumbs 551. Referring to FIG. 5B, for each of the customers corresponding to the client IDs in the client_id column 560, the trading breadcrumbs 551 include frequency data 562 and 564 indicating a number of rejected orders and a number of successful orders, respectively. Further, the trading breadcrumbs 551 may include time date 566 indicating a number of second since a last rejected order. The orders illustrated in FIG. 5B may be, for example, forex-related orders, futures-related orders and/or options-related orders.

FIG. 6A illustrates examples of email/chat breadcrumbs 601. Referring to FIG. 6A, for each of the customers corresponding to the client IDs in the client_id column 610, the trading breadcrumbs 551 include frequency data 612 and 614 indicating a number of chats and emails, respectively. The chats and emails represented in FIG. 6A may be, for example, forex-related chats or emails, futures-related chats or emails and/or options-related chats or emails.

FIG. 6B illustrates examples of account approval breadcrumbs 651. Referring to FIG. 6B, for each of the customers corresponding to the client IDs in the client_id column 660, the account approval breadcrumbs 651 include a binary indication of whether the customer's account is current approved for forex trading 662, a number of days since forex trading approval was granted 664, a binary indication of whether authorization for forex trading was requested recently 666, and a binary indication of whether authorization for forex trading was rejected recently 668. Though, FIG. 6B uses forex-related account approval information as an example, account approval breadcrumbs 651 may also include such account approval information for other types of trades (e.g., futures-related account approval information and/or options-related account approval information).

FIG. 7 illustrates examples of balance breadcrumbs 701. Referring to FIG. 7, for each of the customers corresponding to the client IDs in a client_id column 710, the balance breadcrumbs 701 include a balance delta 712 indicating a change in the customer's balance over a particular period of time, and a cash delta 714 indicating a change in the customer's cash over the particular period of time. The balance and cash information represented in balance breadcrumbs 701 may be associated with, for example, a forex-related account of the customer, a futures-related account of the customer, and/or an options-related account of the customer.

FIG. 8 illustrates an example of digital footprints 801. Referring to FIG. 8, for each of the customers corresponding to the client IDs in the client_id column 810, the digital footprints 801 include breadcrumbs 820 such as those discussed above with reference to FIGS. 5A-7. For example, digital footprints 801 are examples of the footprint that the call driver prediction architecture 102 constructs in step 415.

The call driver prediction architecture 102 may construct the digital footprint in step 415 by storing the digital breadcrumbs retrieved by the call driver prediction architecture 102 in the in the digital footprint DB 150 in such a manner that the obtained digital breadcrumbs are all mapped to the customer for whom the digital footprint is being constructed.

Returning to FIG. 4, after the digital footprint is constructed in step 415, the call driver prediction architecture 102 proceeds to step 420. In step 420, the call driver prediction architecture 102 inputs the digital footprint to the trained AI engine 140.

Figure 9:
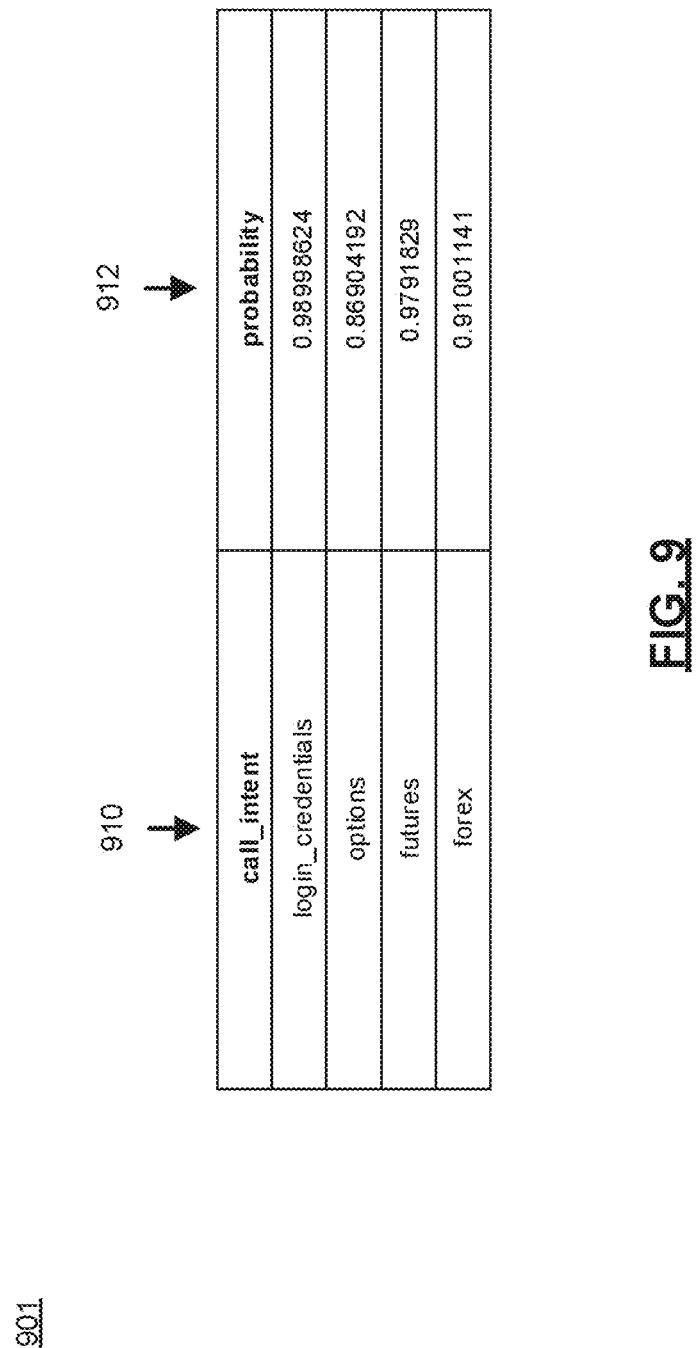
FIG. 9 illustrates an example of probability values output by a trained AI engine according to principles of the present disclosure.

In step 425, the call driver prediction architecture 102 obtains one or more probability values output by the trained AI engine 140 based the digital footprint being input to the trained AI engine 140 in step 420. FIG. 9 illustrates an example of probability values 901 output by the trained AI engine 140. Referring to FIG. 9, for each of the call drivers 910, there is a corresponding probability value 912. After step 425, the call driver prediction architecture 102 proceeds to step 430.

In step 430, the call driver prediction architecture 102 selects a call driver based on the obtained one or more probability values. With respect to the example probability values illustrated in FIG. 9, the call driver prediction architecture 102 may select login credentials as the predicted call driver. After step 430, the call driver prediction architecture 102 proceeds to step 435.

In step 435, the call driver prediction architecture 102 provides the predicted call driver to dashboard 170 for a service representative and/or an interactive voice response (IVR) of a call center of the company associated with the call driver prediction architecture 102. According to at least some example embodiments, the predicted call driver may be provided to the dashboard 170 via the API 160. According to at least some example embodiments, the API 160 may be implement using Node.js™ and/or Cloud Foundry™.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A method comprising:
   selecting a customer of a company;
   constructing a digital footprint of the selected customer;
   inputting the digital footprint to an artificial intelligence (AI) engine;
   obtaining one or more probability values from the AI engine based on the input digital footprint; selecting a call driver, from among a plurality of call drivers, as a predicted call driver; and
   providing the predicted call driver to a call center associated with the company, wherein constructing the digital footprint comprises,
   obtaining a plurality of digital breadcrumbs based on user data of the customer; and
   storing the retrieved digital breadcrumbs in a digital footprint database DB in such a manner that the digital breadcrumbs are all mapped to the customer.

2. The method of claim 1 further comprising:
   detecting a call received at the call center from a customer,
   wherein the selected customer is the customer from whom the call was received.

3. The method of claim 1, wherein obtaining the plurality of digital breadcrumbs comprises:
   retrieving the plurality of digital breadcrumbs from user data of the customer stored in an enterprise data warehouse (EDW) database (DB).

4. The method of claim 1, wherein the AI engine includes at least one of a decision tree, a linear classifier, a neural network, and a time series classifier.

5. The method of claim 1, wherein the one or more probability values correspond, respectively, to one or more call drivers from among the plurality of call drivers.

6. The method of claim 5, wherein selecting a call driver as the predicted call driver includes selecting, as the predicted call driver, the call driver from among the one or more call drivers, that corresponds to the highest probability value from among the one or more probability values.

7. The method of claim 1 further comprising:
receiving an indication of a customer,
wherein the selected customer is the customer for whom the indication was received.

8. A computer system comprising:
memory storing computer-executable instructions; and
a processor configured to execute the computer-executable instructions, wherein the computer-executable instructions include,
selecting a customer of a company;
constructing a digital footprint of the selected customer;
inputting the digital footprint to an artificial intelligence (AD engine;
obtaining one or more probability values from the AI engine based on the input digital footprint;
selecting a call driver, from among a plurality of call drivers, as predicted call driver; and
providing the predicted call driver to a call center associated with the company, wherein constructing the digital footprint includes,
obtaining a plurality of digital breadcrumbs based on user data of the customer; and
storing the retrieved digital breadcrumbs in a digital footprint database DB in such a manner that the digital breadcrumbs are all mapped to the customer.

9. The computer system of claim 8, wherein:
the computer-executable instructions include detecting a call received at the call center from a customer; and
the selected customer is the customer from whom the call was received.

10. The computer system of claim 8, wherein obtaining the plurality of digital breadcrumbs comprises:
retrieving the plurality of digital breadcrumbs from user data of the customer stored in an enterprise data warehouse (EDW) database (DB).

11. The computer system of claim 8, wherein the AI engine includes at least one of a decision tree, a linear classifier, a neural network, and a time series classifier.

12. The computer system of claim 8, wherein:
the one or more probability values correspond, respectively, to one or more call drivers from among the plurality of call drivers.

13. The computer system of claim 12, wherein selecting a call driver as the predicted call driver includes selecting, as the predicted call driver, the call driver from among the one or more call drivers, that corresponds to the highest probability value from among the one or more probability values.

14. The computer system of claim 8, wherein:
the computer-executable instructions include receiving an indication of a customer; and
the selected customer is the customer from whom the indication was received.

* * * * *